United States Patent [19]

Griffiths

[11] Patent Number: 4,654,520
[45] Date of Patent: Mar. 31, 1987

[54] STRUCTURAL MONITORING SYSTEM USING FIBER OPTICS

[76] Inventor: Richard W. Griffiths, 14976 La Cumbra Dr., Pacific Palisades, Calif. 90272

[21] Appl. No.: 712,889

[22] Filed: Mar. 18, 1985

Related U.S. Application Data

[63] Continuation-in-part of Ser. No. 571,364, Jan. 16, 1984, abandoned, which is a continuation of Ser. No. 295,600, Aug. 24, 1981, abandoned.

[51] Int. Cl.$^4$ ................................................. G01L 1/24
[52] U.S. Cl. ..................................... 250/227; 73/800; 250/231 R; 250/231 P; 350/96.15; 350/96.23; 350/96.29; 356/32
[58] Field of Search ............... 250/227, 231 R, 231 P; 73/705, 800; 350/96.15, 96.16, 96.23, 96.29; 356/73.1, 32

[56] References Cited

FOREIGN PATENT DOCUMENTS 0079938  6/1981  Japan .................................. 356/73.1
2036336  6/1980  United Kingdom .................. 73/800
2058394  4/1981  United Kingdom ............. 350/96.23

Primary Examiner—Edward P. Westin
Attorney, Agent, or Firm—Kelly, Bauersfeld & Lowry

[57] ABSTRACT

An optical fiber is securely and continuously fastened to a structure such as a pipeline, offshore platform, bridge, building, dam or even a natural object. A light signal is passed into one end of the optical fiber. Any physical movement of the structure, or sectional movements along the optical fiber path, such as deflection, bending, displacement (changes in linear uniformity) or fracture of the structure will necessarily affect the optical fiber. As a consequence, detectable changes will occur in the "electro-optic signature" (for measurements made at the input end of the optical fiber) or in the light signal transmission (for measurements made at the opposite end of the optical fiber). Such measurements made at the input include reflections resulting from Rayleigh back-scattering and can be periodically or continuously made to determine the magnitude and location of the aforementioned physical movements of the structure. In addition, by utilizing additional optical fibers, the direction and rate, i.e., dynamics, of such physical movements can be determined. The optical fiber itself can be used as a communication link for the transmission of data and voice.

11 Claims, 12 Drawing Figures

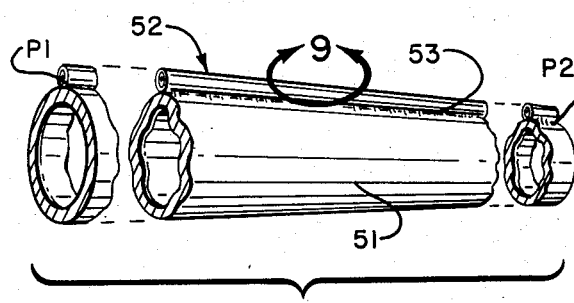
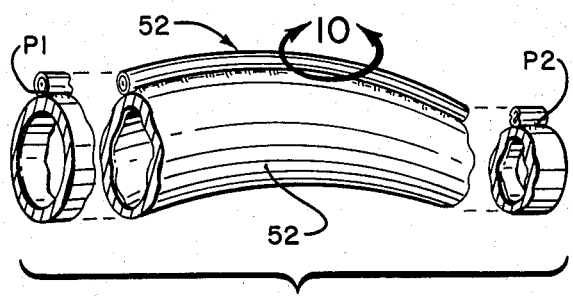
FIG.7   FIG.8
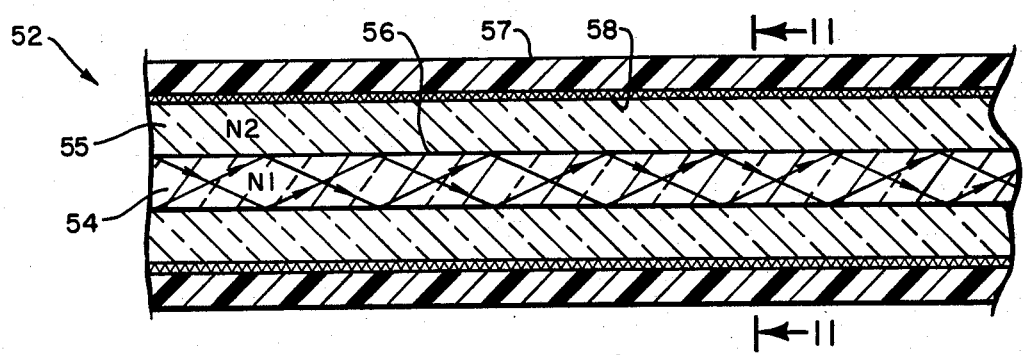
FIG.9
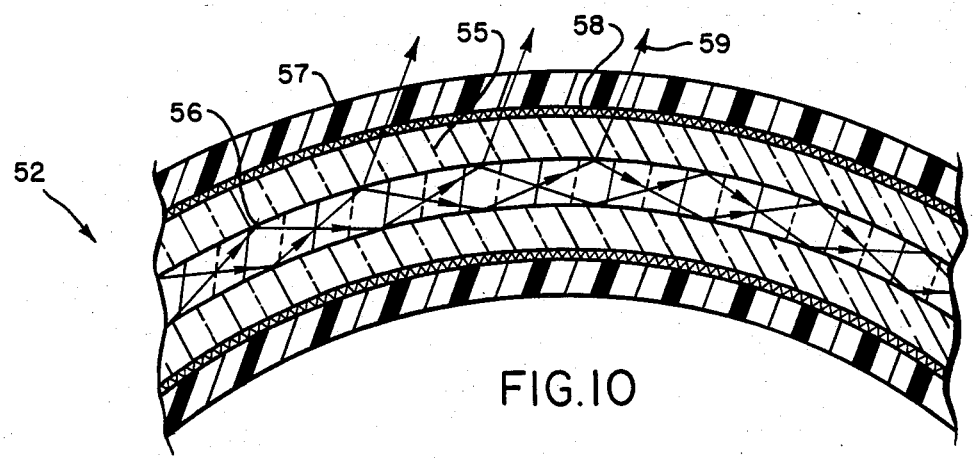
FIG.10
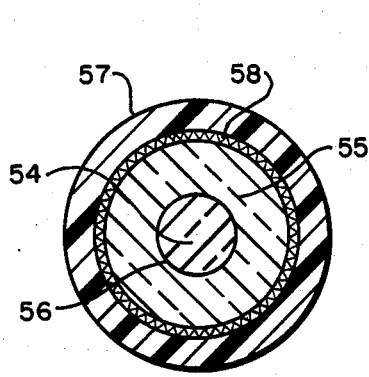
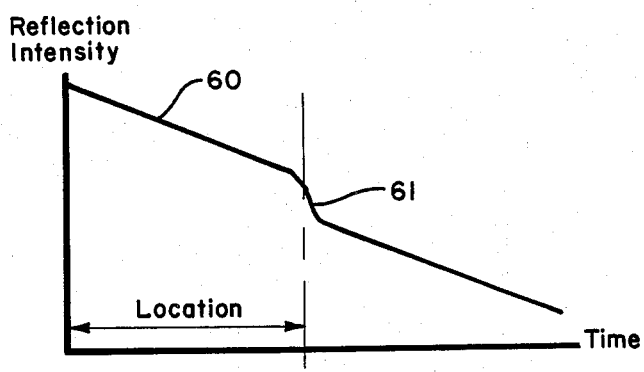
FIG.11   FIG.12

STRUCTURAL MONITORING SYSTEM USING FIBER OPTICS

RELATED APPLICATIONS

This application is a continuation-in-part of my co-pending application Ser. No. 06/571,364 filed Jan. 16, 1984 now abandoned which application in turn is a continuation of my then co-pending application Ser. No. 06/295,600 filed Aug. 24, 1981, now abandoned.

FIELD OF THE INVENTION

This invention relates generally to structural monitoring and more particularly, to a method and apparatus for monitoring man-made or natural structures using fiber optics.

BACKGROUND OF THE INVENTION

There are many man-made structures, such as pipelines, offshore platforms, buildings, bridges, dams and the like for which structural monitoring is important to verify design codes, test loadings and forewarn of potential or actual failures of the structure or parts thereof. For example, it is known to place strain gauges, microphones for acoustic emissions, tilt meters using accelerometers and the like along a structure, such as a marine riser or pipeline to provide signals indicative of strains or deflections beyond normal limits.

Movements in natural objects, such as earth strata or rock formations adjacent to an earthquake fault, are more difficult to measure because of inhomogeneity. Seismic, tilt meter or land surveying techniques are consequently employed to measure acceleration, tilting or displacement, respectively.

While the use of strain gauges or other measurement means periodically spaced along a structure will serve to aid in providing the desired strain data, only those discrete points on the structure to which the strain gauge is secured are monitored. There may be other locations on the structure sufficiently spaced from the point of attachment of the strain gauge or other sensor which will have on influence thereon and yet experience a physical movement or stress which could be significant to the safety or potential failure of the structure.

In addition, power must be supplied to such prior art sensors and data must be acquired, all of which involves cable, power and telemetry equipment, plus associated logistic and maintenance support. The cost for such a system can become excessive and reliability can become impaired because of the number of elements involved.

Attempts have been made to overcome this difficulty by the development of structural frequency-measurement systems placed at a central point on a structure. The technique employs Fourier analysis to detect modal shifts in frequency resulting from changes in structural integrity, such as fractures in members or even loss of members. In the case of an offshore platform, however, the variations in loading on the structure, non-linearity of the foundation (piling) and inconsistency of natural excitation have precluded sufficient signal to noise ratio to render such a system feasible for identifying the location of structural changes.

In view of the foregoing, there is a need for an improved method and apparatus for monitoring some structures wherein all points along the structure, or between designated parts of a structure, can be "continuously" and reliably monitored. By such a "continuous" arrangement, location of structural movement could be determined, there being no gaps in the monitoring system.

BRIEF DESCRIPTION OF THE PRESENT INVENTION

With the foregoing in mind, the present invention contemplates an improved method and apparatus for monitoring structural integrity wherein the monitoring is accomplished by means of fiber optics.

More particularly, physical movements are monitored between spaced points on a structure by attaching at least one optical fiber to the structure to extend from at least one of the spaced points to the other and thereby engage all points along the structure between the spaced points.

A light signal is then passed into the optical fiber and changes in this light signal resulting from the physical movements of the structure are then detected.

The detected changes can be a result of reflections, Rayleigh back scattering, and the like in a light signal (generally pulsed) as a consequence of a movement of the optical fiber. In this case, the detected changes are made at the input end of the optical fiber, these changes being coupled out by means of an optical coupler.

In another embodiment, the light signal (generally continuous) is passed into one end of the optical fiber and changes therein are detected at the other end of the optical fiber. In this case, the detected changes are changes in the transmission characteristics of the light signal through the optical fiber.

A computerized data bank is employed to facilitate the identification of the detected changes and to provide an alarm when these changes exceed preset levels.

BRIEF DESCRIPTION OF THE DRAWINGS

A better understanding of this invention as well as further features and advantages thereof will be had by now referring to the accompanying drawings in which:

FIG. 7 is a fragmentary perspective view of a fiber optic cable continuously attached to a pipe line similar to the showing of FIG. 1 but wherein greatly increased sensitivity is realized by the manner in which the fiber optic cable is constructed;

FIG. 8 is a view of the pipe and cable of FIG. 7 wherein a physical movement such as bending of the pipeline has taken place;

FIG. 9 is a greatly enlarged cross-section of that portion of the cable in FIG. 7 enclosed within the circular arrow 9;

FIG. 10 is a greatly enlarged cross-section of that portion of the cable of FIG. 8 enclosed within the circular arrow 10;

FIG. 11 is a cross-section taken in the direction of the arrows 11—11 of FIG. 9; and FIG. 12 is a plot of reflection intensity as a function of time and thus distance, useful in explaining the monitoring technique.

DETAILED DESCRIPTION OF THE INVENTION

Figure 1:
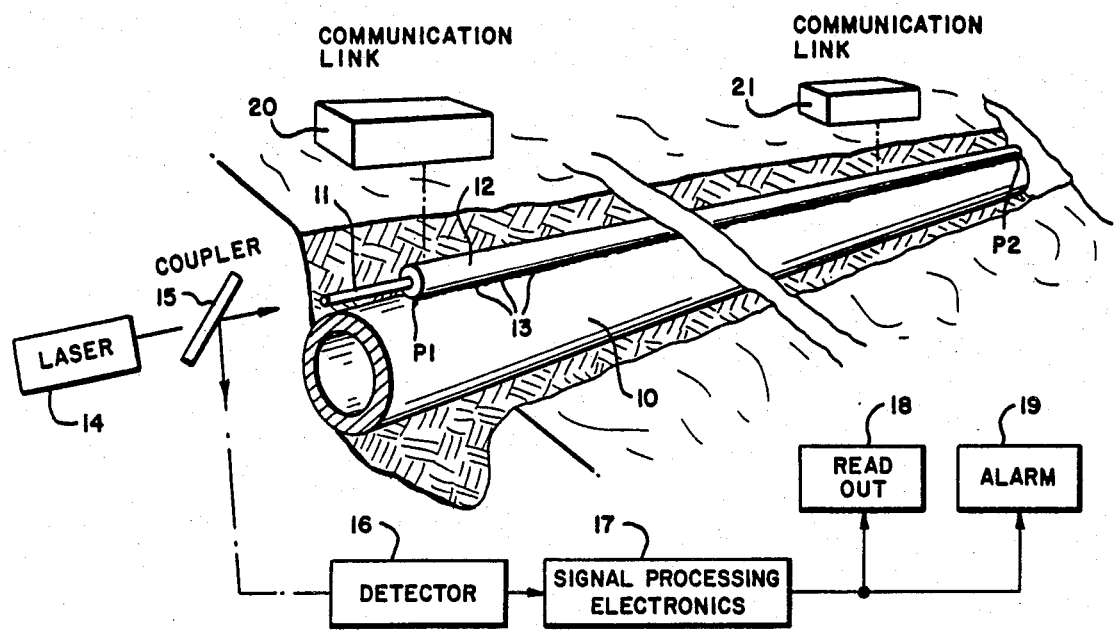
FIG. 1 is a cut-away perspective view of a structure in the form of a pipeline together with apparatus illustrated in block form for monitoring the structural integrity of the pipeline in accord with one embodiment of the present invention.

Referring first to FIG. 1, there is shown a portion of a pipeline 10 constituting an example of a structure to be monitored. In this respect, and as mentioned heretofore, pipelines have been monitored by securing strain gauges or other sensors at periodic points along the line to detect undue strains or movements in an effort to anticipate buckling or other types of failure along the pipeline.

In accord with the present invention, the monitoring of physical movements of the structure is carried out between spaced points indicated in FIG. 1 at P1 and P2 by means of an optical fiber 11 surrounded by a protective sheath 12 useful in attaching the optical fiber to the structure 10. The fiber extends from at least one of the spaced points such as P1 to the other such as P2. It will be understood that P1 and P2 are merely provided as convenient reference points and would normally define the end points of the lengths of the structure to be monitored.

As indicated by the numeral 13, the optical fiber sheath and therefore the optical fiber itself, is continuously attached to the structure 10 so that any physical movement of the structure will result in physical movement of the optical fiber.

Appropriate means are provided for passing a light signal into one end of the optical fiber. In FIG. 1, this means constitutes a laser indicated by the block 14.

Also provided are means for detecting and indicating changes in the light signal provided by the laser 14. This latter detector means receives a reverse travelling wave of the light signal coupled out of the system by coupler 15 and constitutes a detector 16 and cooperating signal processing electronics indicated by the block 17. The detector 16 would normally be a photodetector arrangement. The detected changes in the signal can be read out as indicated by the block 18. By presetting given limits, an alarm 19 can be caused to sound should the detected changes exceed the preset limits.

It will be understood that any type of physical movement of the optical fiber such as slight bending will have an effect upon the reverse travelling wave of the introduced light signal along the optical fiber. Thus various parameters can be detected, such as back scattering sites, discontinuities, attenuation, and the like. Changes in these parameters result from the physical attachment of the optical fiber to the structure and occur as a consequence of physical movements of the pipeline structure 10.

Techniques for indicating the magnitude and location of such changes in the physical characteristics of an optical fiber per se are well known in the art. For example, U.S. Pat. No. 4,243,320 discusses a method for testing optical fibers in which reflected signals produce self-coupling in a laser used to provide the original signal. This self-coupling changes the lasing activity. Any change in the lasing activity will be an indication of a change in the reflection parameter. Thus, the position of a reflected discontinuity in an optical fiber can be determined by simply monitoring the lasing activity. It is to be understood that the present invention is not directed to the specific techniques in and of themselves since the same are already known. Rather, the present invention has to do with combining an optical fiber with a structure, either man-made or natural, to enable structural integrity to be monitored by means of the optical fiber and electro-optic measurements.

Still referring to FIG. 1, there is indicated by the blocks 20 and 21 a communication link at the spaced points P1 and P2. Thus, the same optical fiber used for the monitoring operation can also serve as such a communications link for transmission of voice and/or data and even signals for control of the entire system. In other words, since the optical fiber is already in place, it can additionally serve to transmit data in the manner of conventional fiber optics used in the communications industry on a time share basis.

In FIG. 1, the optical fiber is shown secured along the top of the pipe structure 10. It should be understood that the optical fiber could be secured internally on the undertop wall of the pipe if desired.

Figure 2:
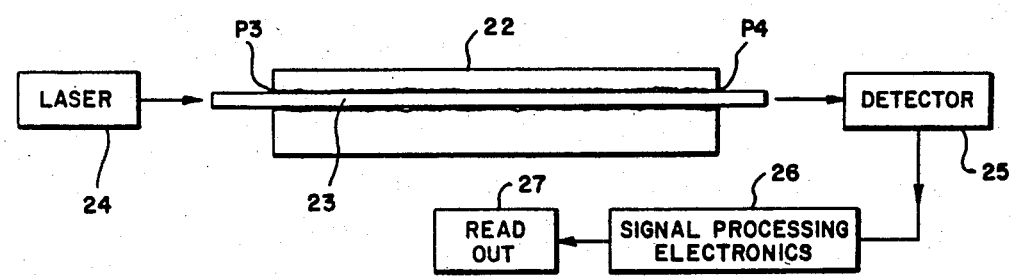
FIG. 2 schematically illustrates partly in block form another embodiment of the structural monitoring system of the present invention.

Referring now to FIG. 2, there is shown at 22 a structure to which an optical fiber 23 has been attached to extend between spaced points P3 and P4. In this embodiment, light from a laser shown at 24 is passed into one end of the optical fiber 23 and the detecting means is positioned to pick up the transmitted light at the other end. This detecting means includes a detector 25 and appropriate signal processing electronics indicated by the block 26. A read-out or display is shown at 27.

In the embodiment of FIG. 2, the changes detected are changes in the transmission characteristics of the light signal.

In both FIGS. 1 and 2, the light signal provided by the laser blocks introduced into the optical fiber can be either continuous, pulsed or even polarized or a combination thereof. The light propagation in the optical fiber itself can be either single or multi mode. As mentioned, the changes in transmission, reflection, back scattering, polarization, attenuation and scattering loss and the like of the light signal resulting from physical movement of or pressure on the optical fiber itself, as a result of the physical movements of the structure, can be detected. The magnitude and location of the physical movement or pressure-causing effect can thus be determined.

The light signal injection technique and optical fiber signature or transmission measurements are similar to those used in the manufacture and testing of optical fibers or for the assessment of field distributions along such optical fibers.

Figure 3:
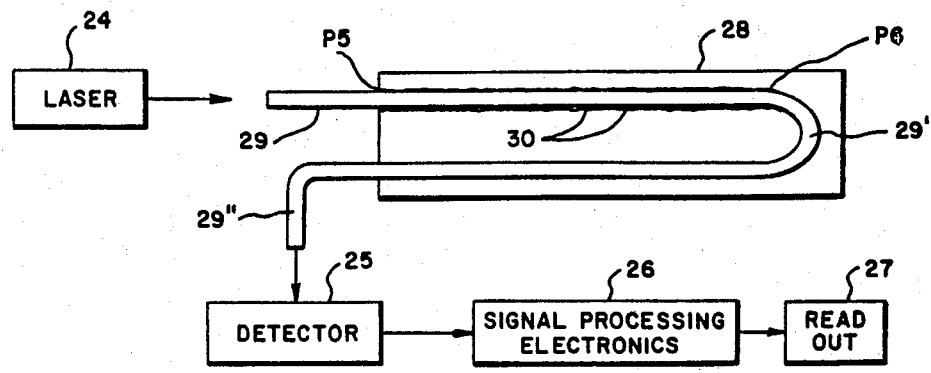
FIG. 3 is a schematic block diagram similar to FIG. 2 illustrating a modification of the monitoring technique.

Referring now to FIG. 3 there is illustrated another arrangement for monitoring a structural member using an optical fiber and light signal transmission characteristics. In this embodiment, there is shown a structure 28 having spaced points defined at P5 and P6. An optical fiber 29 is continuously secured to the structure 28 as indicated at 30 to pass between the points P5 and P6. In this embodiment, the other end of the optical fiber 29 adjacent to the point P6 reverses as at 29' and returns to a point 29" adjacent to the one point P5 to define a loop. A light signal is passed into one end of the optical fiber 29 as indicated by the laser block 24 and changes in the transmission characteristics of the light signal are detected at the other end 29" as by a detector 25 and cooperating signal processing electronics indicated by the block 26 connecting to read-out 27. The blocks 25, 26 and 27 may be the same as the correspondingly numbered blocks shown in FIG. 2.

In FIG. 3, the first portion of the optical fiber 29 is shown attached to the structure 28 between the points P5 and P6 while the reverse portion forming the loop is not indicated as attached. The purpose for this showing is simply to indicate that it is not essential that all of the lengths of the optical fiber be attached to the structure but rather only that portion or section of the optical fiber along the structure to be monitored defined between appropriate end points. However, it should be understood that the reversed or looped portion could be secured to the structure at a spaced location so that different structural portions of the structure can be monitored by the same optical fiber. In this respect, it should be understood that the particular structural path to be monitored need not be straight but can follow any particular path such as bracing members in towers or platforms which can zig-zag back and forth or other non-linear structures.

It will also be noted that there is a portion of the optical fiber 29 free of the structure 28 between the laser 24 and the structure. This portion 29 of the optical fiber is shown in FIG. 3 to indicate that the light source for providing a light signal can be located remotely from the structure itself, the light signal being transmitted through the optical fiber to pass into the optical fiber portion between the first and second points. Similarly the detecting apparatus can be located remotely from the structure itself.

The significance of the measurements in all of the embodiments described thus far is that of change. In other words, the optical fiber signature as determined by back scattering, reflection and the like such as in the embodiment of FIG. 1, or, the light signal transmission characteristics such as in the embodiments of FIGS. 2 and 3, are determined when the structure is in a quiescent or safe condition. It is the change in such light signature or light transmission characteristic that constitutes the significant measurement. As mentioned, the optical fiber itself can take any path as long as the movement permitted along that path is representative of movement of the structure to be monitored.

Figure 4:
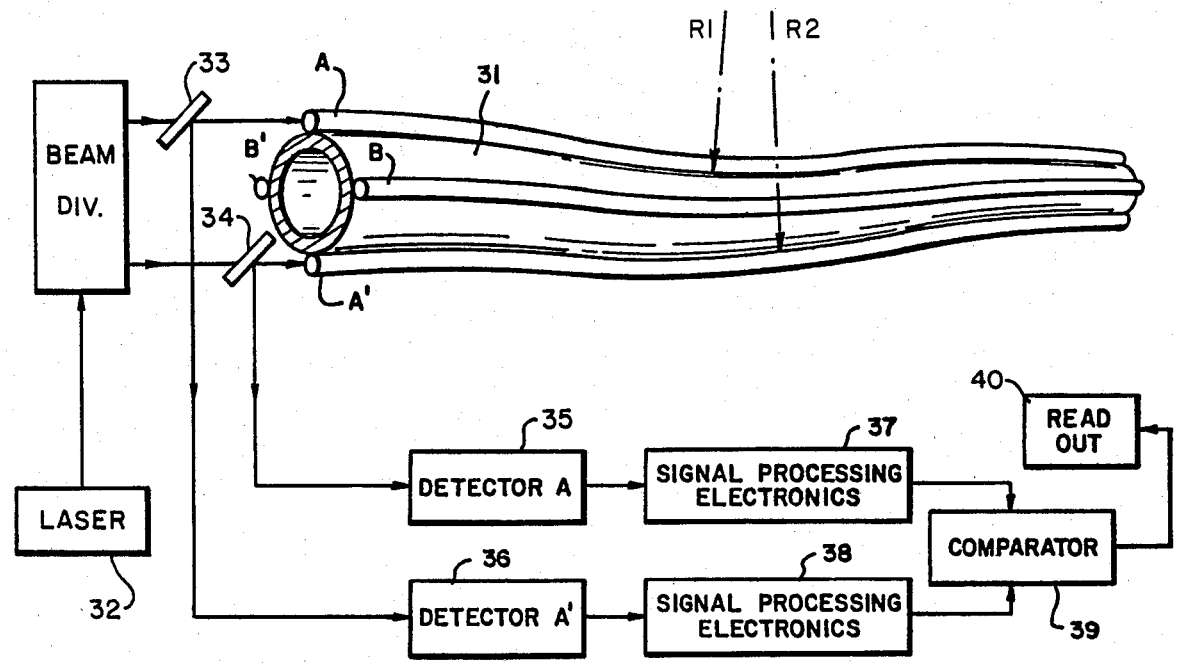
FIG. 4 is a schematic showing partly in block form the manner in which additional optical fibers can be used in accord with the present monitoring system.

Referring now to FIG. 4, there is shown a further embodiment of the present invention which will enable not only the location and magnitude of a physical movement to be measured but also the direction of such movement.

As a specific example, there is shown in FIG. 4 a portion of a pipeline structure 31 to which four optical fibers indicated by the letters A, B, A' and B' are attached. The optical fibers in the example chosen are spaced along four quadrants on the exterior of the pipe structure 31, the pair of optical fibers A, A' extending along the diametrically opposite top and bottom surfaces and the pair of optical fibers B and B' extending along opposite diametrical sides.

With the foregoing arrangement, and considering by way of example, the first mentioned optical fibers A and A', light is introduced into the fibers by way of a laser 32 and beam divider providing identical light beams passing into couplers 33 and 34. Back scattering reflection characteristics are coupled out and passed into first and second detectors 35 and 36 for the respective optical fibers A and A' from which the signals are then appropriately processed in blocks 37 and 38. The output from the blocks 37 and 38 pass to a comparator 39 wherein an appropriate computation is made to determine the direction of any physical movement of the pipe affecting the two optical fibers in question. An appropriate read-out 40 will indicate such direction.

More particularly, it will be appreciated that should the pipe 31 bend as a result of losing support under a certain section thereof, the optical fiber A will experience a bending movement having a given radius of curvature R1 as indicated in FIG. 4. Similarly, the other optical fiber A' will experience a bending as a result of the bending of the pipe structure 31 but the radius of curvature of this bending will be larger as indicated at R2. Thus, the optical fiber A at the point R1 will experience a compression while the optical fiber A' at the point R2 will experience a stretching. These changes result in changes in the light signal all as described heretofore and the changes in the light signals themselves are different in that one will indicate a compression and the other an extension. Thus, a vector or direction of the deformation as well as its magnitude and location can be computed.

Similarly, the direction of lateral movements can be determined by the second pair of optical fibers B and B', shown in FIG. 4 by utilizing similar light introducing and detection circuits.

Figure 5:
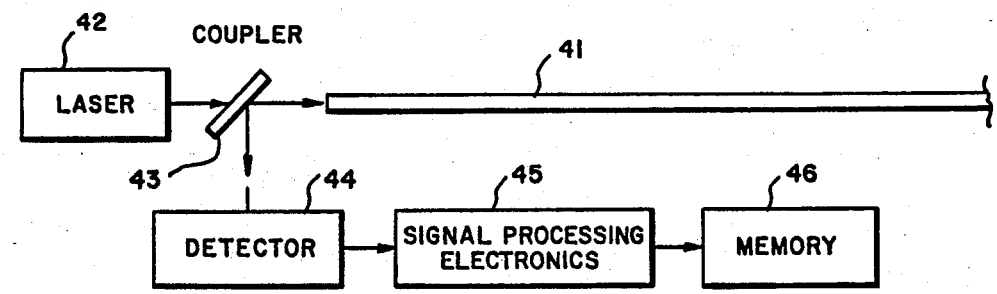
FIG. 5 is a block diagram of a monitoring system in which data is stored in a memory.
Figure 6:
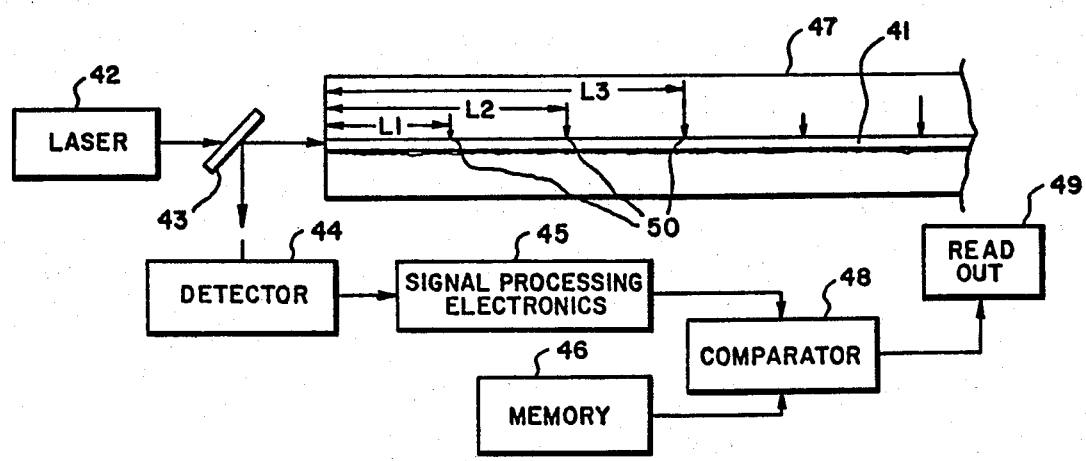
FIG. 6 illustrates the use of data obtained by means of the system of FIG. 5 for monitoring structural integrity in accord with this invention.

Referring now to FIGS. 5 and 6 there is shown a still further technique of structural monitoring in accord with the present invention.

Considering first FIG. 5, there is shown an optical fiber 41 into which a light signal from a laser 42 is passed through coupler 43. Reflection, back scattering and the like from the light signal passing down the optical fiber 41 make up the optical fiber "signature" of the light signal and this "signature" is detected in the detector 44 while the optical fiber 41 is positioned in a predetermined given path or configuration free of any structure. In FIG. 5 this particular path is illustrated as a rectilinear path or straight line.

The output from detector 44 for the light "signature" is passed into the signal processing electronics block 45 and then stored in a memory bank 46. It will now be understood that memory bank 46 includes the "light signature" for the light in the optical fiber 41 when this optical fiber follows a specific path free of any structure.

Referring now to FIG. 6, all of the identical elements described in FIG. 5 are reproduced except that there is now added a structure 47 to which the optical fiber 41 is secured. It is to be noted, however, that the positioning of the optical fiber on the structure 47 follows the identical path as described for the optical fiber free of the structure in FIG. 5. As also mentioned, this predetermined path in the example chosen for illustrative purposes is a rectilinear line.

The same light source such as the laser 42 described in FIG. 5, and same detector 44 and signal processing electronics block 45 are used in FIG. 6 as shown and it will thus be understood that the light "signature" detected by the detector 44 will be identical to the light signature detected in FIG. 5 if and only if the structure 47 exhibits no subsequent physical movements or strains that would cause a movement of the optical fiber 41 away from its predetermined path as illustrated in FIG. 5.

The output of the signal processing electronics 45 in FIG. 6 rather than passing into a memory passes to a comparator 48 for a comparison with the data stored in the memory bank 46 as a consequence of measurements made with the system of FIG. 5. It will now be appreciated that any physical movement of the structure 47 resulting in a shifting of the optical fiber 41 from its predetermined path or straight line in the example chosen will give rise to a signal that is different from that stored in the memory 46. This difference will be detected by the comparator 48 and can be displayed or printed in the read-out 49

As mentioned, it will be understood that this comparative measurement system will be used for any particular predetermined path for the optical fiber. In the particular example of FIGS. 5 and 6 wherein the path is rectilinear, the system is useful for providing immediate measurements of any positional deviations and their magnitude of the structure from a rectilinear configuration.

FIG. 6 illustrates a further feature of the present invention which can be applied to the other embodiments described. Thus, with reference to the optical fiber 41 secured to the structure 47, it will be noted that there are provided markers 50 which are defined as predetermined types of discontinuities or interruptions in the optical fiber 41 to provide a distinctive type of reflective signal in the light signatures, known as Fresnel reflections, which can be easily detected. These "markers" are indicated as being uniformly spaced along the optical fiber 41 to demark given distances such as L1, L2 and L3. The differences in the marker characteristics are indicated by the different sized arrows 50.

With the foregoing arrangement, there will be provided definite standards in the detected reflected light signal corresponding to known distances; that is, locations along the optical fiber. These standards can thus be used to maintain the location determining accuracy of the monitoring equipment.

It will be understood that the comparison measurements described in FIGS. 5 and 6 are for those situations wherein it is desired to detect a deviation of a structure from a given configuration wherein the information for the desired configuration has previously been stored.

In the actual monitoring systems of the other embodiments, similar principles are involved in that there is always being made a comparison of output data with output data previously received either recently or at remote periods in time. In other words, and as heretofore mentioned, it is the change in the characteristics which are significant in the overall monitoring operation.

As will be evident from the foregoing description, when a physical movement is to be detected, the monitoring equipment of FIG. 2, with pulsed light can be employed and the change in the light signal that is detected constitutes a reflected signal. The magnitude of the reflected signal is proportional to the strain introduced by the physical movement. The location or position of the strain change is determined, in turn, by the time it takes for the light signal to make a round trip from its starting point at one end of the fiber to the point of the strain change resulting from the physical movement of the structure and back to the starting point. In the embodiment described, it is the back scattering of light resulting from light loss at the point of physical movement or strain change that is detected. Such back scattering is known as Rayleigh reflections as opposed to the aforementioned Fresnel type reflections which appear in the form of spikes. Since the speed of light in the fiber optic is known, the distance from the one end of the fiber optic cable to the disturbance or location of the physical movement of the structure is easily computed.

The sensitivity of the fiber optic to a physical movement or strain-related deflection can be greatly increased by making use of a phenomenon known as "microbending". This phenomenon can be briefly explained as follows. Essentially, an optical fiber functions as a waveguide. It normally includes a core surrounded by a cladding of material having a different index of refraction from that of the core. Light is thus internally reflected at the interface of the core and cladding and generally precluded from escaping from the core. The light is thus essentially propagated or guided down the core.

Imperfections at any point along the cladding will result in a change in its refractive index. This change, in turn, permits some light to escape, representing loss; reflections also occur at such discontinuity and these reflections, as mentioned, are termed Rayleigh back scattering.

By subjecting the cladding to aggravation, the aforementioned change in refractive index can be induced from a point on the surface of the cladding. This disturbance will create the same effect as imperfections and result in light loss by accentuating microbending and Rayleigh reflections.

U.S. Pat. No. 4,421,979 to Asawa et al. discloses the use of microbend transducers which include mechanical amplifiers to facilitate detections of remote structural forces. These transducers are located at discrete points on a structure. An optical fiber free of the structure is engaged periodically by the transducers so that reflections are only detectable from discrete locations.

In accord with an important feature of the present invention, I have provided not only a continuous structural monitoring system but also greatly increased its sensitivity by providing an improved optic fiber construction which, in effect, provides a superior sensor cable. This cable incorporates an integral continuum of microbend elements, thereby amplifying the reflected signal introduced as a result of strain in the fiber resulting from a physical movement of the structure at any point along the structure to which the fiber is attached.

All of the foregoing will be better understood by now referring to FIGS. 7 through 10.

In FIG. 7 there is shown a pipe line 51 with fiber optic cable 52 continuously attached thereto as by cement 53 between spaced points P1 and P2. The showing is similar to FIG. 1.

FIG. 8 shows the cable 52 subject to a physical movement such as a bend as a result of movement of a portion of the pipe line 51.

It will be understood that a light signal is passed through the cable 52 and changes detected by appropriate equipment such as shown in FIGS. 5 and 6.

FIG. 9 shows the improved sensor cable 52 in greater detail wherein the fiber optic essentially constitutes a core 54 surrounded by cladding 55. Core 54 has a refractive index of N1 while cladding 55 has a different refractive index N2. A first light signal represented by the lines with arrows in the core of FIG. 9 is substantially retained in the core by internal reflections from the interface 56 of the core and cladding so long as the index of refraction N2 of the cladding is not changed.

In accord with a feature of the present invention, a sheath 57 surrounds the cladding and has a coating 58 of fixed particulate material uniformly spread over its interior wall surface in intimate engagement with the outer surface of the cladding 55. This particulate material may have a representative grain size of from 5 to 23 microns. The coating 58 is similar to a sand paper and as mentioned engages the cladding continuously throughout the length of the cable.

Whenever a disturbance occurs, such as a bending of the pipe line portion as depicted in FIG. 8, a strain in the sheath 57 will induce the particulate material to distort the homogeneity of at least a portion of the cladding 55. In other words, a physical movement between the spaced points of the structure sets up a strain change in the sheath, cladding and core at a point corresponding to the location of the physical movement. In this respect, it will be understood that the spaced points P1 and P2 of FIGS. 1 and 7 could typically be several meters or even kilometers apart. The portion of the pipe line experiencing a bending or physicad 7 could typically be several meters or even kilometers apart. The portion of the pipe line experiencing a bending or physical movement, on the other hand might be over only a short distance at any location between the points. It is over this relatively short distance that the distortion of the cladding will cause an enhanced back scattering type reflection due to loss of light. Thus, because of the continuous attachment of the cable, any point between the spaced points that is disturbed will experience microbend reflections in the optical fiber at the same point and thereby more accurately determine the location of such point and the magnitude of the disturbance.

FIG. 10 shows the cable section of FIG. 9 under the bending condition shown in FIG. 8. It will be noted that the light rays within the core may still experience some internal reflection at the interface 56 while other light rays escape such as indicated at 59. As mentioned, the loss of light is a result of the distortion of the cladding by the particulate coating 58 caused by the bending of the cable.

In FIGS. 9 and 10 the sheath 57 is the same as the protective sheath 12 referred to in FIG. 1. In this respect, the sheath protects the cable from contaminants such as radiation, gases, moisture, etc. As mentioned, the sheath itself serves as an attachment means to the structure and thus is designed to transmit any physical movement to the optical fiber as opposed to "protecting" the fiber from such movements.

FIG. 11 shows the cable in cross-section wherein it is clear that the particulate coating 58 completely surrounds the cladding 55.

FIG. 12 illustrates a logarithmic plot of the measured reflected signal intensity (ordinate) as a function of time (abscissa). Since the light signal travels unit distances in unit time intervals, the time is also a function of distance. The plot shown depicts a situation where a disturbance has taken place in the structure causing bending of the optical fiber at a point between the spaced points P1 and P2 of the pipe line.

Utilizing a pulsed light signal, back scattering or Rayleigh reflections will occur at the point of loss of light. The normal attenuation of the reflected signal in an optical fiber with increasing distance is shown at 60. At 61 there is shown a sudden loss of light resulting from a structure caused strain on the fiber as described. The distance of this loss 61 from the zero point on the plot defines the location of the structural movement and the amount of loss at 61, the magnitude.

It will be recalled with respect to FIG. 4 that the direction of any structural movement can be determined by providing further sensor cables affixed to the structure. In addition, the rate of movement or "dynamics" of the movement can be determined by using the time response of the structure in a given direction and noting when that movement returns to its original position.

From all of the foregoing, it will now be evident that the present invention has provided an improved method and apparatus for enabling continuous monitoring of a structural member of all points between starting and end points on the structure. In other words, this system output will be continuous relative to the structure, not at discrete locations only as with strain gauges previously mentioned or other prior art systems employing microphones, tilt meters using accelerometers, discrete microbend transducers, and the like.

Various further applications and modifications falling within the scope and spirit of this invention will occur to those skilled in the art. The method and apparatus accordingly are not to be thought of as limited to the specific embodiment set forth merely for illustrative purposes.

I claim:

1. A method of monitoring a physical movement occurring at any point between spaced points on a structure including the steps of:
   (a) attaching with attachment means at least one optical fiber continuously to said structure to extend from at least one of the spaced points to the other and thereby engage all points along the structure between said spaced points so that physical movement of the structure between said spaced points will result in physical movement of the optical fiber;
   (b) passing a first light signal into said optical fiber; and
   (c) detecting reflection changes in said first light signal resulting from said physical movement to thereby provide an indication that a physical movement has taken place and a indication of the location and magnitude of said movement.

2. The method of claim 1, including the steps of detecting and storing characteristics of said light signal passing through said optical fiber when said optical fiber is positioned to follow a precise, predetermined path prior to attaching the optical fiber to said structure; and comparing the stored characteristics with detected changes in the light signal after the optical fiber has been attached to said structure in an identical path configuration, to thereby provide a measure of any subsequent deviations of the structure from said predetermined path.

3. A method of determining the locations of physical movement occurring along a continuum of points between spaced points on a structure, said method including the steps of:
   (a) attaching with attachment means at least one optical fiber continuously to said structure to extend from at least one of the spaced points to the other and thereby engage all points along the structure between said spaced points so that physical movement of the structure between said spaced points will result in physical movement of said optical fiber;

(b) passing a first light signal into said optical fiber; and (c) continuously detecting individual multiple light reflections in said fiber along the continuum of points between spaced points to identify points along the structure at which a physical movement has taken place and to provide an indication of the magnitude of all such movements.

4. An apparatus for monitoring a physical movement between spaced points on a structure including, in combination:

(a) at least one optical fiber;

(b) attachment means between said optical fiber and said structure for attaching said optical fiber continuously to said structure to extend from at least one of the spaced points to the other and thereby directly engage all points along the structure between said spaced points so that physical movement of the structure between said spaced points will result in physical movement of the optical fiber;

(c) means for passing a first light signal into said optical fiber;

(d) means for detecting and indicating reflection changes in said first light signal as a consequence of said physical movement; and, (e) means responsive to said reflection changes for indicating the location and magnitude of said physical movement.

5. An apparatus according to claim 4, including memory means for storing the light signal signature of the optical fiber when the optical fiber is positioned in a predetermined path prior to attachment to the structure; and comparator means connected to receive the output of said memory and light signal changes after said optical fiber has been attached to said structure to follow an identical path so that subsequent movements of said structure away from said predetermined path are indicated when the light signal changes received differ from those stored in said memory.

6. An apparatus according to claim 4, in which said structure constitutes a pipe line.

7. An apparatus according to claim 4, in which said optical fiber includes a core and surrounding cladding; a sheath surrounding the cladding; and aggravating means in the form of a continuous particulate coating between said sheath and cladding continuously in intimate engagement with said cladding extending along the length of said optical fiber sheath and cladding continuously in intimate engagement with said cladding extending along the length of said optical fiber between said spaced points and responsive to said physical movement of said structure to effect a microbending in a portion of the optical fiber directly engaging the structure between said spaced points to thereby enhance said changes in said first light signal.

8. An apparatus according to claim 7, in which said means comprises a roughened surface simulating sand paper.

9. An apparatus for monitoring a physical movement between spaced points on a structure including, in combination:

(a) at least on optical fiber;

(b) means for attaching said optical fiber continuously to said structure to extend from at least one of the spaced points to the other and thereby engage all points along the structure between said spaced points;

(c) means for passing a first light signal into said optical fiber;

(d) means for detecting and indicating reflection changes in said first light signal as a consequence of said physical movement;

(e) means responsive to said reflection changes for indicating the location and magnitude of said physical movement;

(f) at least one additional optical fiber secured to said structure along portions of the structure spaced from said one optical fiber;

(g) means for passing a second light signal into said additional optical fiber;

(h) means for detecting changes in said second light signal resulting from said physical movement of the structure; and (j) means for comparing the changes in said first light signal with the changes in said second light signal to thereby enable the direction of said physical movement to be determined.

10. An apparatus for monitoring a physical movement between spaced points on a structure including, in combination:

(a) at least one optical fiber;

(b) attachment means between said optical fiber and said structure for attaching said optical fiber continuously to said structure to extend from at least one of the spaced points to the other and thereby engage all points along the structure between said spaced points so that physical movement of said structure between said spaced points will result in physical movement of said optical fiber;

(c) means for passing a first light signal into said optical fiber;

(d) means for detecting and indicating reflection changes in said first light signal as a consequence of said physical movement; and (e) means responsive to said reflection changes for indicating the location and magnitude of said physical movement;

(f) said optical fiber including a core and surrounding cladding, said cladding having an index of refraction different from the index of refraction of said core, said first light signal passing through said core being substantially retained in the core by internal reflections from the interface of said core and cladding so long as the index of refraction of said cladding is not changes; a sheath surrounding said cladding, said sheath having a coating of fixed particulate material uniformly spread over its interior wall surface in intimate engagement with the outer surface of said cladding, said particulate material having a diameter of from 5 to 23 microns, said particulate material radially moving into and distorting the homogeneity of at least a portion of said cladding whenever said sheath, cladding and core are subject to tension as a result of said physical movement of said structure attached to said fiber, the distortion resulting in a change in the index of refraction of the cladding such that some light is permitted to escape from said core and cladding at the location of said physical movement thereby generating Rayleigh back scattering reflection changes in said light signal.

11. A method of monitoring a physical movement occurring at any point between spaced points on a structure including the steps of:

(a) attaching at least one optical fiber continuously to said structure to extend from at least one of the spaced points to the other and thereby engage all points along the structure between said spaced points;

(b) passing a first light signal into said optical fiber;

(c) detecting reflection changes in said first light signal resulting from said physical movement to thereby provide an indication that a physical movement has taken place and an indication of the location and magnitude of said movement;

(d) attaching at least one additional optical fiber to said structure extending along portions of the structure spaced from said one optical fiber;

(e) passing a second light signal into said additional optical fiber;

(f) detecting changes in said second light signal resulting from said physical movement of the structure; and (g) comparing the changes in said first light signal with the changes in said second light signal to thereby enable the direction of said physical movement to be determined.

* * * * *